(12) United States Patent
Stoffels et al.

(10) Patent No.: US 10,428,728 B2
(45) Date of Patent: Oct. 1, 2019

(54) METHOD FOR OPERATING AN INTERNAL COMBUSTION ENGINE WITH PARALLEL SUPERCHARGING AND WITH AN ACTIVATABLE TURBINE, AND INTERNAL COMBUSTION ENGINE FOR CARRYING OUT A METHOD OF SAID TYPE

(71) Applicant: Ford Global Technologies, LLC, Dearborn, MI (US)

(72) Inventors: Harald Stoffels, Cologne (DE); Ludwig Stump, Cologne (DE); Klemens Grieser, Langenfeld (DE); Jens Wojahn, Bergisch Gladbach (DE); Franz J. Brinkmann, Huerth-Efferen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 15/423,417

(22) Filed: Feb. 2, 2017

(65) Prior Publication Data

US 2017/0226924 A1    Aug. 10, 2017

(30) Foreign Application Priority Data

Feb. 4, 2016  (DE) ........................ 10 2016 201 729

(51) Int. Cl.
*F02B 33/44* (2006.01)
*F02B 37/16* (2006.01)
*F02B 37/007* (2006.01)
*F02D 23/00* (2006.01)

(52) U.S. Cl.
CPC ............ *F02B 37/16* (2013.01); *F02B 37/007* (2013.01); *F02D 23/00* (2013.01)

(58) Field of Classification Search
CPC ...... F02B 37/001; F02B 37/007; F02B 37/16; F02D 23/00
USPC ......................................................... 60/611
See application file for complete search history.

(56) References Cited

U.S. PATENT DOCUMENTS 8,973,361 B2    3/2015 Shimizu et al.

FOREIGN PATENT DOCUMENTS

| DE | 3704967 C1 | 5/1988 |
| DE | 102007046655 A1 | 4/2009 |
| DE | 202015101924 U1 | 6/2015 |

*Primary Examiner* — Ngoc T Nguyen
(74) *Attorney, Agent, or Firm* — Geoffrey Brumbaugh; McCoy Russell LLP

(57) ABSTRACT

Embodiments for an engine coupled to a first turbocharger and a second turbocharger are provided. One example includes responsive to a first condition, deactivating a first turbine of the first turbocharger and meeting a boost demand via operation of the second turbocharger, and responsive to deactivating the first turbine, increasing a pressure at a compressor-side end of a bearing arrangement of a shaft of the first turbocharger. In this way, oil leakage from the bearing arrangement may be reduced.

19 Claims, 4 Drawing Sheets

METHOD FOR OPERATING AN INTERNAL COMBUSTION ENGINE WITH PARALLEL SUPERCHARGING AND WITH AN ACTIVATABLE TURBINE, AND INTERNAL COMBUSTION ENGINE FOR CARRYING OUT A METHOD OF SAID TYPE

CROSS REFERENCE TO RELATED APPLICATIONS

This application claims priority to German Patent Application No. 102016201729.2, filed on Feb. 4, 2016. The entire contents of the above-referenced application are hereby incorporated by reference in its entirety for all purposes.

FIELD

The disclosure relates to a method for operating a supercharged internal combustion engine.

BACKGROUND AND SUMMARY

Internal combustion engines may include a cylinder block and at least one cylinder head which are connected to one another at an assembly end side to form the cylinders. To control the charge exchange, an internal combustion engine may utilize control elements—generally in the form of lifting valves—and actuating devices for actuating these control elements. Each lifting valve moves, so as to realize, that is to say perform, a valve lift, between an open position and a closed position, and in so doing, during an opening duration, opens up the opening associated with the valve. The valve actuating mechanism for the movement of the valve, including the valve itself, is referred to as the valve drive. The cylinder head often serves to accommodate the valve drives.

During the charge exchange, the combustion gases are discharged via the outlet openings of the cylinders and the charging with charge air takes place via the inlet openings. The valve drives open and close the inlet and outlet openings at the correct times, with a fast opening of the largest possible flow cross sections generally being sought in order to keep the throttling losses in the inflowing and outflowing gas flows low and in order to ensure the best possible charging of the cylinders and an effective discharge of the exhaust gases. The cylinders are also often provided with two or more inlet and outlet openings.

The intake lines which lead to the inlet openings, and the exhaust lines which adjoin the outlet openings, may be at least partially integrated in the cylinder head. The exhaust lines of the cylinders generally merge to form one common overall exhaust line, or else merge in groups to form two or more overall exhaust lines. The merging of exhaust lines to form an overall exhaust line is referred to in general and within the context of the present disclosure as an exhaust manifold, with that part of the overall exhaust line which lies upstream of a turbine arranged in the overall exhaust line being considered according to the disclosure as belonging to the exhaust manifold.

Downstream of the manifold, the exhaust gases may be supplied, for the purpose of supercharging of the internal combustion engine, to the turbines of at least two exhaust-gas turbochargers and if appropriate to one or more systems for exhaust-gas aftertreatment.

The advantages of an exhaust-gas turbocharger for example in relation to a mechanical charger are that no mechanical connection for transmitting power exists or is required between the charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

An exhaust-gas turbocharger comprises a compressor and a turbine which are arranged on the same shaft. The hot exhaust-gas flow is fed to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the at least two cylinders is obtained. A charge-air cooling arrangement may be provided, by which the compressed charge air is cooled before it enters the cylinders.

Supercharging serves primarily to increase the power of the internal combustion engine. Here, the air for the combustion process is compressed, as a result of which a greater air mass can be supplied to each cylinder per working cycle. In this way, the fuel mass and therefore the mean pressure may be increased. Supercharging is a suitable mechanism for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is thus possible to shift the load collective toward higher loads, at which the specific fuel consumption is lower. By supercharging in combination with suitable transmission configurations, it is also possible to realize so-called downspeeding, with which it is likewise possible to achieve a lower specific fuel consumption. Supercharging consequently assists in the constant efforts in the development of internal combustion engines to minimize fuel consumption, that is to say to improve the efficiency of the internal combustion engine.

It is basically sought to arrange the turbine of an exhaust-gas turbocharger as close as possible to the outlet openings of the cylinder in order thereby firstly to be able to make optimum use of the exhaust-gas enthalpy of the hot exhaust gases, which is determined significantly by the exhaust-gas pressure and the exhaust-gas temperature, and secondly to ensure a fast response behavior of the turbine and thus of the turbocharger. In this connection, it is therefore also fundamentally sought to minimize the thermal inertia and the volume of the line system between the outlet openings of the cylinders and of the turbine, which may be achieved by reducing the mass and the length of the exhaust lines.

The configuration of the exhaust-gas turbocharging often poses difficulties, wherein it is basically sought to obtain a noticeable performance increase in all rotational speed ranges.

According to previous systems, a severe torque drop is however observed in the event of a certain engine speed being undershot. Said torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. This has the result that, toward lower engine speeds, the charge pressure ratio and the charge pressure likewise decrease, which equates to a torque drop.

In the previous systems, it is sought to improve the torque characteristic of a supercharged internal combustion engine using various measures.

One such measure, for example, is a small design of the turbine cross section and simultaneous provision of an exhaust-gas blow-off facility. Such a turbine is also referred to as a wastegate turbine. If the exhaust-gas flow rate exceeds a critical value, a part of the exhaust-gas flow is, within the course of the so-called exhaust-gas blow-off, conducted via a bypass line past the turbine. This approach has the disadvantage that the supercharging behavior is inadequate at relatively high rotational speeds or in the case of relatively high exhaust-gas quantities.

The torque characteristic may also be advantageously influenced by multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower engine speed range. This is achieved by designing the high-pressure turbine for small exhaust-gas mass flows and by providing a bypass line by means of which, with increasing exhaust-gas mass flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine, wherein a shut-off element is arranged in the bypass line in order to control the exhaust-gas flow conducted past the high-pressure turbine. The response behavior of an internal combustion engine supercharged in this way is considerably improved in relation to a similar internal combustion engine with single-stage supercharging, because the relatively small high-pressure stage is less inert, that is to say the rotor of a smaller-dimensioned exhaust-gas turbocharger can be accelerated more rapidly.

The torque characteristic of a supercharged internal combustion engine may furthermore be improved by multiple turbochargers arranged in parallel, that is to say by multiple turbines of relatively small turbine cross section arranged in parallel, wherein turbines are activated successively with increasing exhaust-gas flow rate.

However, the inventors herein have recognized an issue with the above approaches. The rotational speed of an activatable turbine decreases drastically when the latter is deactivated, such that, upon reactivation, the rotor of said turbine may initially be accelerated in order to be able to generate and provide the desired charge pressure at the compressor side. The response behavior is thus impaired.

If the deactivated turbine is fed with a low exhaust-gas flow rate, the rotational speed of the deactivated turbine falls to a lesser extent, and a minimum rotational speed of the charger shaft can be ensured or maintained. The latter has a further relevant advantage. Specifically, if the rotational speed of the charger shaft falls below a minimum rotational speed, or if the charger shaft even comes to a standstill, the seal of the bearing arrangement of the oil-lubricated charger shaft can leak at the compressor side. Oil leakage at the intake side has severe disadvantages. If oil passes via the associated compressor into the intake system, the oil-contaminated fresh charge supplied to the cylinders adversely affects the combustion process, whereby, in particular, the untreated particle emissions can greatly increase. The oil may also be deposited on the inner walls of the intake system and impair the flow conditions in the intake system and/or in the compressor, and contaminate a charge-air cooler arranged downstream.

There are numerous reasons for the oil leakage. Firstly, the labyrinth seal that is generally used in the case of charger shafts appears to provide a satisfactory sealing action only when the charge shaft is at a certain minimum rotational speed. Secondly, when the turbine is deactivated, or when the compressor is not being driven, it is generally the case that a negative pressure prevails at the compressor-side end of the bearing arrangement, which negative pressure sucks or pulls the oil out of the bearing and into the intake system downstream of the non-driven compressor. In this context, it may be taken into consideration that, when the turbine is deactivated, the non-driven compressor is generally separated from the common intake system, wherein a blow-off line is preferably provided, which serves as a bypass line and which branches off from the intake system downstream of the compressor and opens into the intake system upstream of an additional operational compressor. An intake system of said type supports the generation of a negative pressure at the compressor-side end of the bearing arrangement when the turbine is deactivated, or when the compressor is not being driven. It is commonly the case that material bushings or rings, preferably rings with an open joint, are provided, that is to say arranged, in the labyrinth seal.

Accordingly, a method for operating a supercharged internal combustion engine having at least one cylinder head, having at least two cylinders and having an intake system for the supply of charge air to the at least two cylinders, in which each cylinder has at least two outlet openings for the discharge of the exhaust gases, at least one of which is in the form of an activatable outlet opening, each outlet opening being adjoined by an exhaust line for the discharge of the exhaust gases via an exhaust-gas discharge system, at least two exhaust-gas turbochargers are provided, each exhaust-gas turbocharger comprising a turbine and a compressor which are arranged on the same shaft, which shaft is mounted rotatably in an oil-lubricated bearing arrangement, the compressors of the at least two exhaust-gas turbochargers are arranged in parallel in the intake system, each compressor being arranged in a separate intake line of the intake system, and the separate intake lines merging, downstream of the compressors, to form an overall intake line, a first shut-off element is arranged, downstream of the first compressor, in the associated intake line, the exhaust lines of the activatable outlet openings of the at least two cylinders merge, with the formation of a first exhaust manifold, to form a first overall exhaust line which is connected to the turbine of the first exhaust-gas turbocharger, and the exhaust lines of the other outlet openings of the at least two cylinders merge, with the formation of a second exhaust manifold, to form a second overall exhaust line which is connected to the turbine of the second exhaust-gas turbocharger, is provided. The method comprises, proceeding from a deactivated first turbine and deactivated outlet openings, increasing a pressure at a compressor-side end of the bearing arrangement of the shaft of the first exhaust-gas turbocharger using at least one auxiliary mechanism.

In the method according to the disclosure, the generation of a negative pressure at the compressor-side end of the bearing arrangement when the first turbine is deactivated, or when the first compressor is not being driven, is counteracted, and/or the pressure prevailing at the compressor-side end of the bearing arrangement is increased. For this purpose, auxiliary mechanisms are used by which the relevant pressure is increased.

The oil-lubricated bearing arrangement of the shaft of a charger is generally connected, via a return line, to the crankcase of the internal combustion engine, wherein ambient pressure or positive pressure prevails in the crankcase. In interaction with the negative pressure that generally prevails at the compressor-side end of the bearing arrangement when the first turbine is deactivated, or when the first compressor is not being driven, a pressure gradient is thus realized across the bearing seal, which pressure gradient gives rise to oil leakage and forces or drives oil out of the bearing arrangement into the intake system at the compressor side.

The auxiliary mechanism that is used according to the disclosure for increasing the pressure may in this case assume a wide variety of forms, wherein it is also possible for multiple auxiliary mechanisms to be provided which are used jointly, that is to say simultaneously, or alternatively, that is to say alternately and so as to complement one another.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
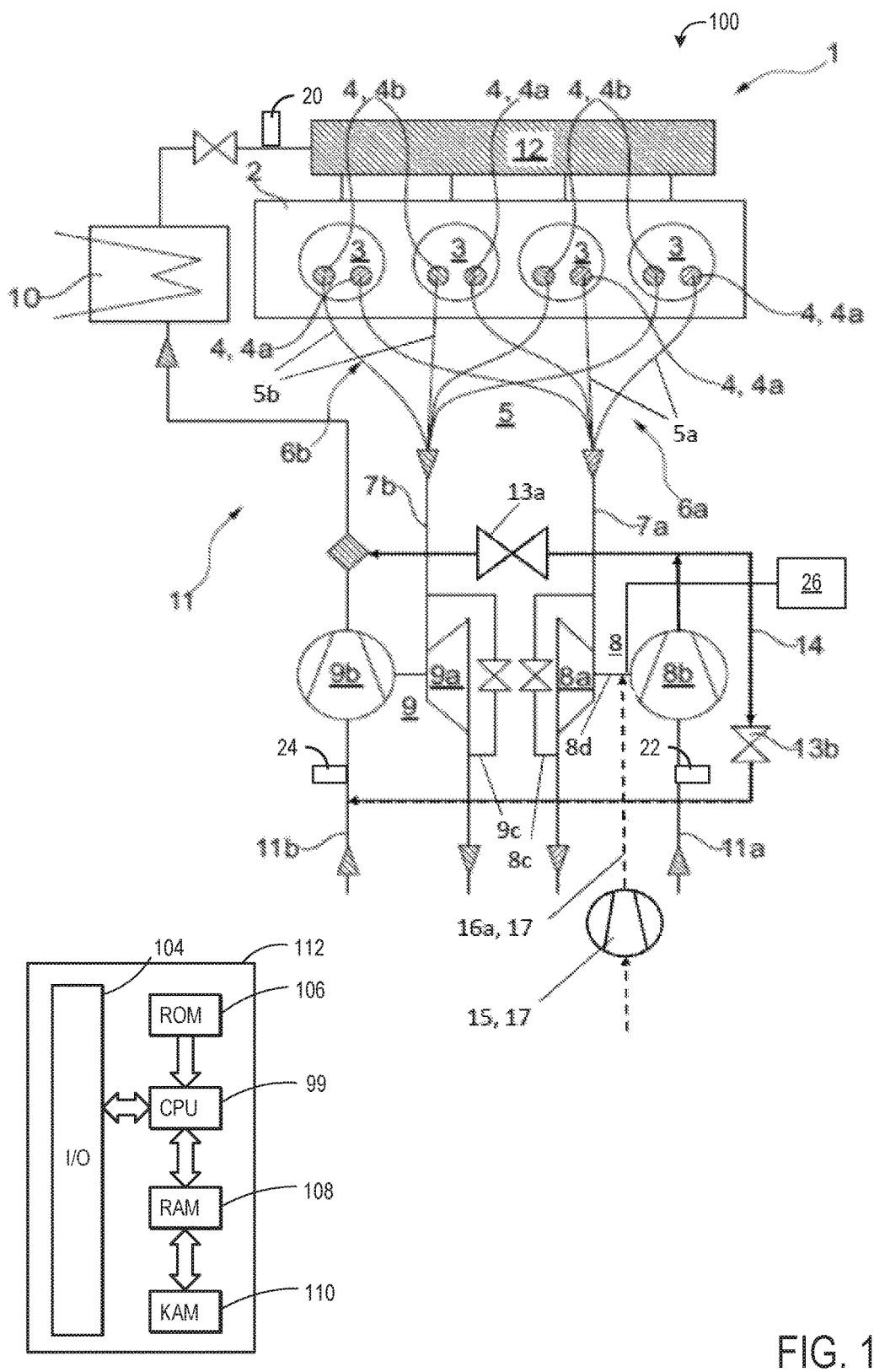
FIG. 1 schematically shows a first embodiment of the internal combustion engine.

As explained above, a parallel-sequential turbocharger arrangement operating in a single-turbo mode may result in a complete stand-still of the first (inactive) turbocharger. This may cause leakage of oil through the turbocharger's sealing system, in turn causing oil in the intake air that could lead to abnormal combustion effects. Beside this, the rotor and bearing system of the inactive turbocharger may be degraded.

According to embodiments disclosed herein, the oil leakage may be addressed by employing a small secondary air-pump, which may be operated in the conditions where the first turbocharger is deactivated. Once the boost pressure passes a certain threshold, the pump switches off, and thus does not consume any energy for its operation.

In another example, assuming that the deactivated turbocharger can be propelled electrically in addition to the exhaust energy path, the turbocharger shaft may be propelled electrically until the boost pressure passes the threshold. Above this, the shaft is already propelled at a sufficient speed, and no leakages should occur.

A supercharged internal combustion engine having at least two turbines arranged in parallel is also the subject matter of the present disclosure. At least one turbine is in the form of an activatable turbine which is acted on with exhaust gas, that is to say activated, only in the presence of relatively high exhaust-gas flow rates.

To further improve the torque characteristic, each cylinder of the internal combustion engine according to the disclosure is equipped with at least one activatable outlet opening. The exhaust lines of at least two cylinders are then merged in grouped fashion such that the exhaust lines of the activatable outlet openings and the exhaust lines of the other outlet openings are merged, in each case with the formation of an exhaust manifold, to form an overall exhaust line.

The exhaust lines of the activatable outlet openings lead to the turbine of the first exhaust-gas turbocharger, and the exhaust lines of the other outlet openings lead to the turbine of the second exhaust-gas turbocharger. The first turbine, which is assigned to the activatable outlet openings, is thus in the form of an activatable turbine. The activatable outlet openings are actuated during the course of the charge exchange, and the activatable turbine thereby activated, that is to say acted on with exhaust gas, only in the presence of relatively large exhaust-gas flow rates.

In comparison with concepts in which a single coherent exhaust line system is provided upstream of the two turbines, the above-described grouping, that is to say the use of two mutually separate exhaust systems, noticeably improves the operating behavior of the internal combustion engine, in particular at low exhaust-gas flow rates, inter alia because the line volume upstream of the second turbine, through which exhaust gas flows continuously, is reduced in size by this measure, which is advantageous, and in particular improves the response behavior, at low loads and engine speeds, that is to say in the presence of low exhaust-gas flow rates.

To ensure a minimum rotational speed of the activatable turbine, the activatable turbine may be supplied with a small exhaust-gas flow even when its outlet openings are deactivated. For this purpose, a corresponding line could be provided to connect an exhaust manifold to the first turbine, possibly with the use of at least one additional shut-off element, though this would disadvantageously increase the complexity and space requirement of the exhaust line system upstream of the turbines. Furthermore, the line would create a connection between the two exhaust manifolds, and the grouping described above would be eliminated. The effects obtained through the use of two mutually separate exhaust manifolds would be at least lessened.

It would also be possible for the deactivated first turbine to be fed with a small exhaust-gas flow by virtue of the lifting valve of at least one deactivated outlet opening continuing to be operated with a reduced lift and/or a shortened opening duration, such that the deactivated first turbine continues to be acted on with exhaust gas. When the first turbine is deactivated, the valve of at least one switchable outlet opening would not be deactivated in the true sense but would continue to be operated and actuated throughout with a reduced lift and/or a shortened opening duration. A reduced or low exhaust-gas flow rate is then supplied to the deactivated first turbine. For this purpose, it is however necessary for the lifting valves belonging to the switchable outlet openings to be not only switchable, that is to say to not only be capable of being activated or deactivated, but to also be more extensively adjustable, so as to be switchable in at least multi-stage fashion.

However, as explained above, one issue with operating with a deactivated turbine is that the associated compressor also does not rotate, leading to an inability to maintain a sufficient seal at the bearings of the turbocharger. Thus, according to embodiments disclosed herein, when the turbine is deactivated, the pressure at the associated compressor may be increased via an auxiliary pressure increasing mechanism. For example, a pump may be used to increase the pressure at the compressor-side end of the bearing arrangement of the shaft. In another example, the pressure at the compressor-side end of the bearing arrangement of the shaft may be increased using the charge pressure which prevails, and is picked off, downstream of the second, operational compressor in the intake system.

An internal combustion engine according to the disclosure may also have two cylinder heads. It is also possible for three exhaust-gas turbochargers to be provided.

Three-cylinder in-line engines are seldomly equipped with two turbines arranged in parallel. The merging of the exhaust lines in accordance with the disclosure, however, permits this without problems even though three-cylinder in-line engines are normally only poorly suited to grouping, in particular cylinder grouping.

Therefore, embodiments are also provided in which the internal combustion engine has a cylinder head with three cylinders.

Embodiments of the method are provided in which the pressure at the compressor-side end of the bearing arrangement of the shaft of the first exhaust-gas turbocharger is increased using a pump, compressed air being provided by way of the pump via a first feed line. In the above example, a pump is used to increase the pressure at the compressor-side end of the bearing arrangement of the shaft. The pump may be an electrically drivable pump.

Embodiments may alternatively or additionally also be provided in which the pressure at the compressor-side end of the bearing arrangement of the shaft of the first exhaust-gas turbocharger is increased using a second feed line, said second feed line branching off from the intake system downstream of the second compressor and providing charge air which serves as compressed air. In the above example, the pressure at the compressor-side end of the bearing arrangement of the shaft is increased using the charge pressure which prevails, and is picked off, downstream of the second, operational compressor in the intake system.

Both in the cases in which a pump is used to increase the pressure at the compressor-side end of the bearing arrangement of the shaft of the first exhaust-gas turbocharger and in the cases in which a second feed line and the charge pressure prevailing in the intake system downstream of the second compressor serve for increasing the pressure of relevance here, embodiments may be provided in which the compressed air is used in order to drive the first compressor and set the shaft in rotation.

Then, when the first turbine is deactivated, a low air flow rate is supplied or provided to the first compressor, which low air flow rate sets the at least one compressor impeller arranged on the shaft, and thus also the shaft itself, in rotation. In this way, the rotational speed of the shaft falls to a lesser extent, and/or a minimum rotational speed of the charger shaft can be ensured or maintained. The rotating rotor of the first compressor furthermore ensures an increase of the pressure prevailing in the intake system downstream. Compressor-side oil leakage is thus counteracted in two ways, specifically firstly by way of the setting of the shaft in rotation, and secondly by way of the increase of the compressor-side pressure. The latter reduces the driving pressure gradient which exists across the compressor-side seal of the bearing arrangement of the oil-lubricated charger shaft, which results in oil leakage and which drives or forces the oil into the intake system.

It is basically also possible at the turbine side for oil to pass out of the bearing arrangement via the deactivated first turbine into the exhaust-gas system, whereby exhaust-gas aftertreatment systems provided downstream, that is to say catalytic converters and particle filters, would be contaminated with oil, and the conversion rates of said exhaust-gas aftertreatment systems would be severely impaired. It may even be the case that the service life of the exhaust-gas aftertreatment systems is shortened, wherein the functionality of said exhaust-gas aftertreatment systems may basically also be put at risk.

Both in the cases in which a pump is used to increase the pressure at the compressor-side end of the bearing arrangement of the shaft of the first exhaust-gas turbocharger and in the cases in which a second feed line and the charge pressure prevailing in the intake system downstream of the second compressor serve for increasing the pressure of relevance here, embodiments may also be provided in which the compressed air is used to directly increase the pressure at the compressor-side end of the bearing arrangement of the shaft of the first exhaust-gas turbocharger.

In the above example, the pressure at the compressor-side end of the bearing arrangement of the shaft of the first exhaust-gas turbocharger is directly increased by virtue of the bearing arrangement or bearing seal at the compressor side being acted on with compressed air via the first feed line or via the second feed line, such that the pressure prevailing there is increased. The driving pressure gradient which conveys oil into the intake system via the compressor-side seal is reduced in this way.

Both in the cases in which a pump is used to increase the pressure at the compressor-side end of the bearing arrangement of the shaft of the first exhaust-gas turbocharger and in the cases in which a second feed line and the charge pressure prevailing in the intake system downstream of the second compressor serve for increasing the pressure of relevance here, embodiments may also be provided in which the compressed air is used to increase the pressure in the separate intake line of the first compressor.

In the above example, the pressure at the compressor-side end of the bearing arrangement of the shaft of the first exhaust-gas turbocharger is increased not directly but rather indirectly. For this purpose, using the compressed air, the pressure in the intake system is increased, whereby it is inevitably also the case that the pressure at the compressor-side end of the bearing arrangement of the shaft is increased, such that the pressure gradient which is responsible for the oil leakage, and which drives oil into the intake system across the compressor-side seal, is reduced.

If both a pump together with first feed line and a second feed line are available for pressure-increasing purposes, embodiments are provided in which the pressure at the compressor-side end of the bearing arrangement of the shaft of the first exhaust-gas turbocharger is increased using the second feed line if a charge pressure $p_{charge}$ prevailing in the intake system downstream of the second compressor is higher than a predefinable minimum charge pressure $p_{charge,min}$, with $p_{charge} \geq p_{charge,min}$, and using the pump and the first feed line if the charge pressure $p_{charge}$ prevailing in the intake system downstream of the second compressor is lower than a predefinable minimum charge pressure $p_{charge,min}$, with $p_{charge} < p_{charge,min}$.

This embodiment makes allowance for the fact that the extraction of charge air downstream of the second compressor results in, that is to say entails, a decrease of the provided charge pressure. Since, with regard to a demanded torque or a power demand, it is necessary to provide an adequately high charge pressure, operating states of the internal combustion engine may arise which prohibit, and make impossible, the extraction of charge air from the intake system for the purposes of providing compressed air.

Embodiments are provided in which the pressure at the compressor-side end of the bearing arrangement of the shaft of the first exhaust-gas turbocharger is increased using a second feed line, said second feed line branching off from the intake system downstream of the second compressor and providing charge air which serves as compressed air, the pressure at the compressor-side end of the bearing arrangement of the shaft of the first exhaust-gas turbocharger being increased using the second feed line if a charge pressure $p_{charge}$ prevailing in the intake system downstream of the second compressor is higher than a predefinable minimum charge pressure $p_{charge,min}$, with $p_{charge} \geq p_{charge,min}$.

The above variant relates to embodiments in which a second feed line, but no pump, is available for pressure-increasing purposes. The statements that have been made in conjunction with the above-discussed variant with regard to the extraction of charge air downstream of the second compressor apply here unchanged. A lowering of the provided charge pressure as a result of an extraction of charge air is not possible in all operating states of the internal combustion engine.

Embodiments may be provided in which the pressure at the compressor-side end of the bearing arrangement of the shaft of the first exhaust-gas turbocharger is increased using an electric auxiliary drive which is at least connectable in terms of drive to the shaft of the first exhaust-gas turbocharger, an activated electric auxiliary drive setting the shaft, and at least one compressor impeller mounted on the shaft, in rotation.

The electric auxiliary drive is used to drive the first compressor and set the shaft in rotation. In this way, the shaft does not come to a standstill. A minimum rotational speed of the charger shaft can, under some circumstances, be ensured or maintained. The rotating rotor of the first compressor furthermore ensures a reduction of the negative pressure prevailing in the intake system downstream. Compressor-side oil leakage is thus counteracted firstly by the setting of the shaft in rotation and secondly by way of the reduction of the compressor-side negative pressure. The latter reduces the pressure gradient which forms at the compressor side across the bearing seal and which causes the oil leakage.

In the present case, the first compressor does not serve for generating the charge pressure. The first compressor runs, as it were, at idle, and not under load in the manner of the second, operational compressor, which provides the demanded charge pressure.

In embodiments in which, in addition to an electric auxiliary drive of the described type, a second feed line is available for pressure-increasing purposes, embodiments are provided in this context in which the pressure at the compressor-side end of the bearing arrangement of the shaft of the first exhaust-gas turbocharger is increased using the electric auxiliary drive if a charge pressure $p_{charge}$ prevailing in the intake system downstream of the second compressor is lower than a predefinable minimum charge pressure $p_{charge,min}$, with $p_{charge} < p_{charge,min}$.

In an example, a supercharged internal combustion engine for carrying out a method of a type described above, includes a supercharged internal combustion engine having at least one cylinder head, having at least two cylinders and having an intake system for the supply of charge air to the at least two cylinders, in which internal combustion engine,
   each cylinder has at least two outlet openings for the discharge of the exhaust gases, at least one of which is in the form of an activatable outlet opening, each outlet opening being adjoined by an exhaust line for the discharge of the exhaust gases via an exhaust-gas discharge system,
      at least two exhaust-gas turbochargers are provided, each exhaust-gas turbocharger comprising a turbine and a compressor which are arranged on the same shaft, which shaft is mounted rotatably in an oil-lubricated bearing arrangement,
      the compressors of the at least two exhaust-gas turbochargers are arranged in parallel in the intake system, each compressor being arranged in a separate intake line of the intake system, and the separate intake lines merging, downstream of the compressors, to form an overall intake line,
      a first shut-off element is arranged, downstream of the first compressor, in the associated intake line,
      the exhaust lines of the activatable outlet openings of the at least two cylinders merge, with the formation of a first exhaust manifold, to form a first overall exhaust line which is connected to the turbine of the first exhaust-gas turbocharger, and
      the exhaust lines of the other outlet openings of the at least two cylinders merge, with the formation of a second exhaust manifold, to form a second overall exhaust line which is connected to the turbine of the second exhaust-gas turbocharger, and
      at least one auxiliary mechanism is provided for increasing the pressure at the compressor-side end of the bearing arrangement of the shaft of the first exhaust-gas turbocharger.

That which has been stated in conjunction with the method according to the disclosure likewise applies to the internal combustion engine according to the disclosure.

According to the disclosure, when the first turbine is deactivated, the first compressor can be separated from the rest of the intake system in order that the second compressor does not impart a delivery action into the first compressor. For this purpose, a first shut-off element is arranged in the associated intake line downstream of the first compressor, which first shut-off element serves for the deactivation of said compressor.

When the turbine is deactivated, the first compressor is not driven in earnest, that is to say not with the intention of generating charge pressure. In order that the first compressor then, if appropriate, does not impart a delivery action counter to the resistance of the closed first shut-off element, a blow-off line is advantageous, via which the charge air can escape or be discharged.

Embodiments of the internal combustion engine are provided in which the exhaust lines of the at least two cylinders merge to form the overall exhaust lines within the at least one cylinder head.

The integration of the exhaust manifolds into the cylinder head reduces the mass and the length of the exhaust-gas discharge systems from the outlet openings to the turbines. In this way, the exhaust-gas enthalpy of the hot exhaust gases can be utilized optimally, and fast response behavior of the turbochargers can be ensured. Furthermore, exhaust-gas aftertreatment systems arranged close to the outlet reach their operating temperature or light-off temperature quickly, in particular after a cold start of the internal combustion engine. The integration of the exhaust manifolds into the cylinder head furthermore permits extremely dense packaging of the drive unit, and furthermore has the advantage that said exhaust manifolds can benefit from a liquid-type cooling arrangement possibly provided in the cylinder head, in such a way that the manifolds do not need to be manufactured from materials that can be subjected to high thermal load and which are thus expensive.

The integration of the exhaust manifolds into the cylinder head also leads to a reduced number of components, and consequently to a reduction in costs, in particular assembly and procurement costs.

Embodiments of the internal combustion engine are provided in which each activatable outlet opening is equipped with a switchable lifting valve, a deactivated lifting valve shutting off the associated outlet opening and an activated lifting valve moving between an open position and a closed position so as to realize a valve lift $\Delta h_{max}$, and in so doing opening up the associated outlet opening during an opening duration $\Delta t_{max}$.

Embodiments of the internal combustion engine are provided in which each activatable outlet opening is equipped with an adjustable lifting valve, wherein an adjustable lifting valve is a lifting valve which is adjustable with regard to the valve lift $\Delta h$ and/or the opening duration $\Delta t$. The adjustable lifting valve may be a lifting valve which is adjustable in multi-stage fashion, in particular a lifting valve which is adjustable in three-stage fashion, or a lifting valve which is adjustable in continuously variable fashion.

Embodiments of the internal combustion engine are provided in which the overall exhaust lines merge to form a common exhaust line downstream of the turbines. It is then possible for exhaust-gas aftertreatment of all of the exhaust gas from the at least two cylinders to be performed, specifically by way of an exhaust-gas aftertreatment system arranged in the common exhaust line. This may for example be a particle filter, an oxidation catalytic converter, and/or an exhaust-gas aftertreatment system for the reduction of nitrogen oxides.

Embodiments of the internal combustion engine are provided in which at least one turbine has a variable turbine geometry, which permits extensive adaptation to the respective operating point by adjustment of the turbine geometry or of the effective turbine cross section. Here, guide blades for influencing the flow direction are arranged upstream of the impeller of the turbine. In contrast to the impeller blades of the rotating impeller, the guide blades do not rotate with the shaft of the turbine, that is to say with the impeller. The guide blades are arranged so as to be stationary but not so as to be completely immovable, rather so as to be rotatable about their axis such that the flow approaching the impeller blades can be influenced. In contrast, if a turbine has a fixed, invariable geometry, the guide blades are not only stationary but rather also completely immovable, that is to say rigidly fixed.

Embodiments of the internal combustion engine are provided in which at least one turbine is in the form of a wastegate turbine.

In this context, embodiments of the internal combustion engine are provided in which the turbine of the first exhaust-gas turbocharger is in the form of a wastegate turbine, a first bypass line branching off from the exhaust-gas discharge system, with the formation of a first junction, upstream of said first turbine and a shut-off element being provided in the first bypass line.

In this context, embodiments of the internal combustion engine are provided in which the turbine of the second exhaust-gas turbocharger is in the form of a wastegate turbine, a second bypass line branching off from the exhaust-gas discharge system, with the formation of a second junction, upstream of said second turbine and a shut-off element being provided in the second bypass line.

Embodiments of the internal combustion engine are provided in which a pump is provided as auxiliary mechanism, an operational pump providing compressed air via a first feed line.

Embodiments of the internal combustion engine are provided in which a second feed line is provided as auxiliary mechanism, said second feed line branching off from the intake system downstream of the second compressor and providing charge air which serves as compressed air.

In this context, embodiments of the internal combustion engine are provided in which the second feed line opens into the first feed line.

Here, embodiments of the internal combustion engine are provided in which the second feed line opens into the first feed line, with a junction being formed, a shut-off element being arranged at the junction.

As already mentioned, embodiments of the internal combustion engine are provided in which a blow-off line is provided which branches off from the associated intake line between the first compressor and the first shut-off element and which opens into the other intake line preferably upstream of the second compressor, and a second shut-off element may be arranged in the blow-off line.

Since it is generally the case that negative pressure prevails upstream of the second compressor, an open blow-off line has the effect that negative pressure likewise prevails in the intake system downstream of the deactivated first compressor, whereby a pressure gradient across the bearing seal is realized.

The cylinder head of a supercharged internal combustion engine is basically a component that is subject to high thermal and mechanical loading. In particular, with the integration of the exhaust manifolds, the thermal loading of the internal combustion engine and of the cylinder head is increased yet further, such that increased demands are to be placed on the cooling arrangement. Embodiments of the supercharged internal combustion engine are therefore provided in which a liquid-type cooling arrangement is provided.

Within the context of the present disclosure, the expression "internal combustion engine" encompasses in particular Otto-cycle engines but also diesel engines and hybrid internal combustion engines, which utilize a hybrid combustion process, and also hybrid drives which comprise not only the internal combustion engine but also an electric machine which can be connected in terms of drive to the internal combustion engine and which receives power from the internal combustion engine or which, as an activatable auxiliary drive, additionally outputs power.

FIG. 1 schematically shows a first embodiment of an engine system 100 including the supercharged internal combustion engine 1 which is equipped with two exhaust-gas turbochargers 8, 9. Each exhaust-gas turbocharger 8, 9 comprises a turbine 8a, 9a and a compressor 8b, 9b which are arranged on the same shaft 8d, which shaft is mounted rotatably in an oil-lubricated bearing arrangement. The hot exhaust gas expands in the turbines 8a, 9a with a release of energy. The compressors 8b, 9b compress the charge air which is supplied to the cylinders 3 via intake system 11, charge-air cooler 10 and plenum 12, as a result of which supercharging of the internal combustion engine 1 is realized.

Said internal combustion engine is a four-cylinder in-line engine 1 in which the four cylinders 3 are arranged along the longitudinal axis of the cylinder head 2, that is to say in a line. Each cylinder 3 has two outlet openings 4 (a first outlet opening 4a and a second outlet opening 4b) which are adjoined by exhaust lines (a first exhaust line 5a and a second exhaust line 5b) for discharging the exhaust gases via an exhaust-gas discharge system 5. In each case the first outlet opening 4a of each cylinder 3 is designed as an activatable outlet opening 4a which is opened during the course of the charge exchange only if the exhaust-gas flow rate exceeds a predefined exhaust-gas flow rate and the first turbine 8a arranged downstream is to be activated, that is to say impinged on with exhaust gas.

The first exhaust lines 5a of the activatable outlet openings 4a of all the cylinders 3 merge, with the formation of a first exhaust manifold 6a, to form a first overall exhaust line 7a which is connected to the turbine 8a of the first exhaust-gas turbocharger 8, which thus functions as an activatable turbine 8a (also referred to as a first turbine).

The second exhaust lines 5b of the second outlet openings 4b of all the cylinders 3 merge, with the formation of a second exhaust manifold 6b, to form a second overall exhaust line 7b which is connected to the turbine 9a of the second exhaust-gas turbocharger 9, also referred to as a second turbine.

Both turbines 8a, 9a are of wastegate type of construction, wherein, in each case, a bypass line 8c, 9c branches off from the associated overall exhaust line 7a, 7b upstream of a turbine 8a, 9a and opens into the overall exhaust line 7a, 7b again downstream of said turbine 8a, 9a. The bypass lines 8c, 9c are equipped with shut-off elements.

The internal combustion engine 1 has an intake system 11 for the supply of the charge air to the cylinders 3, wherein the compressors 8b, 9b of the turbochargers 8, 9 are arranged in parallel in the intake system 11. The first compressor 8b is arranged in a first intake line 11a, and the second compressor 9b is arranged in a second intake line 11b. The intake lines 11a, 11b merge downstream of the compressors 8b, 9b to form an overall intake line.

A first shut-off element 13a is arranged downstream of the first compressor 8b in the first intake line 11a, such that, when the first turbine 8a is deactivated, the first compressor 8b can be separated from the rest of the intake system 11, that is to say deactivated, and the second compressor 9b does not impart a delivery action into the first compressor 8b.

Specifically, the first compressor 8b is not actively driven when the turbine 8a is deactivated. In order that the first compressor 8b however does not impart a delivery action counter to the resistance of the closed first shut-off element 13a, a blow-off line 14 is provided via which the charge air can be delivered into the second intake line 11b upstream of the second compressor 9b. A second shut-off element 13b is arranged in the blow-off line 14.

When the first outlet openings 4a are deactivated, the first turbine 8a is deactivated, whereby the first compressor 8b is not driven. Then, it is generally the case that a negative pressure prevails at the compressor-side end of the shaft bearing arrangement, which negative pressure sucks oil out of the bearing arrangement into the intake system 11. To prevent oil leakage, the pressure at the compressor-side end of the bearing arrangement of the shaft 8d of the first exhaust-gas turbocharger 8 is increased using auxiliary mechanism 17.

In the embodiment illustrated in FIG. 1, a pump 15 is provided which subjects the bearing arrangement or the bearing seal to the action of compressed air at the compressor side via a first supply line 16a, such that the pressure prevailing there is increased. The pressure gradient which conveys oil into the intake system 11 via the compressor-side seal of the bearing arrangement is reduced in this way. In some examples, the shaft of the first turbocharger may be propelled (e.g., rotated) via an electric drive, such as a motor 26. The motor 26 may be powered by a vehicle battery or other suitable energy source.

The engine system may further include a control system. The control system may include a controller 112. The controller 112 is shown in FIG. 1 as a microcomputer, including microprocessor unit 99, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 1, in addition to those signals previously discussed, including measurement of inducted mass air flow (MAF) from one or more mass air flow sensors, such as mass air flow sensor 22 (positioned to measure mass flow into the first compressor) and mass air flow sensor 24 (positioned to measure mass flow into the second compressor); engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor 20 (in some examples, MAP sensor 20 may additionally or alternatively measure manifold temperature). Engine speed signal, RPM, may be generated by controller 112 from signal PIP. Additional sensors may be positioned in the exhaust to measure exhaust gas temperature, exhaust-gas aftertreatment system temperature, or other temperatures; exhaust gas mass flow; exhaust gas oxygen concentration; and/or other parameters.

Storage medium read-only memory 106 can be programmed with computer readable data representing instructions executable by processor 99 for performing the methods described below as well as other variants that are anticipated but not specifically listed. Example methods are described with reference to FIG. 3.

The controller 112 receives signals from the various sensors of FIG. 1 and employs the various actuators of FIG. 1 to adjust engine operation based on the received signals and instructions stored on a memory of the controller. For example, the controller may receive feedback from one or more sensors to determine engine load, engine speed, exhaust gas mass flow, and/or boost pressure (such as feedback from MAF, MAP, PIP sensors, and exhaust sensors) and may then adjust a position of one or more of the wastegates, shut-off valves, actuators controlling the first outlet openings, and auxiliary mechanism(s).

Figure 2:
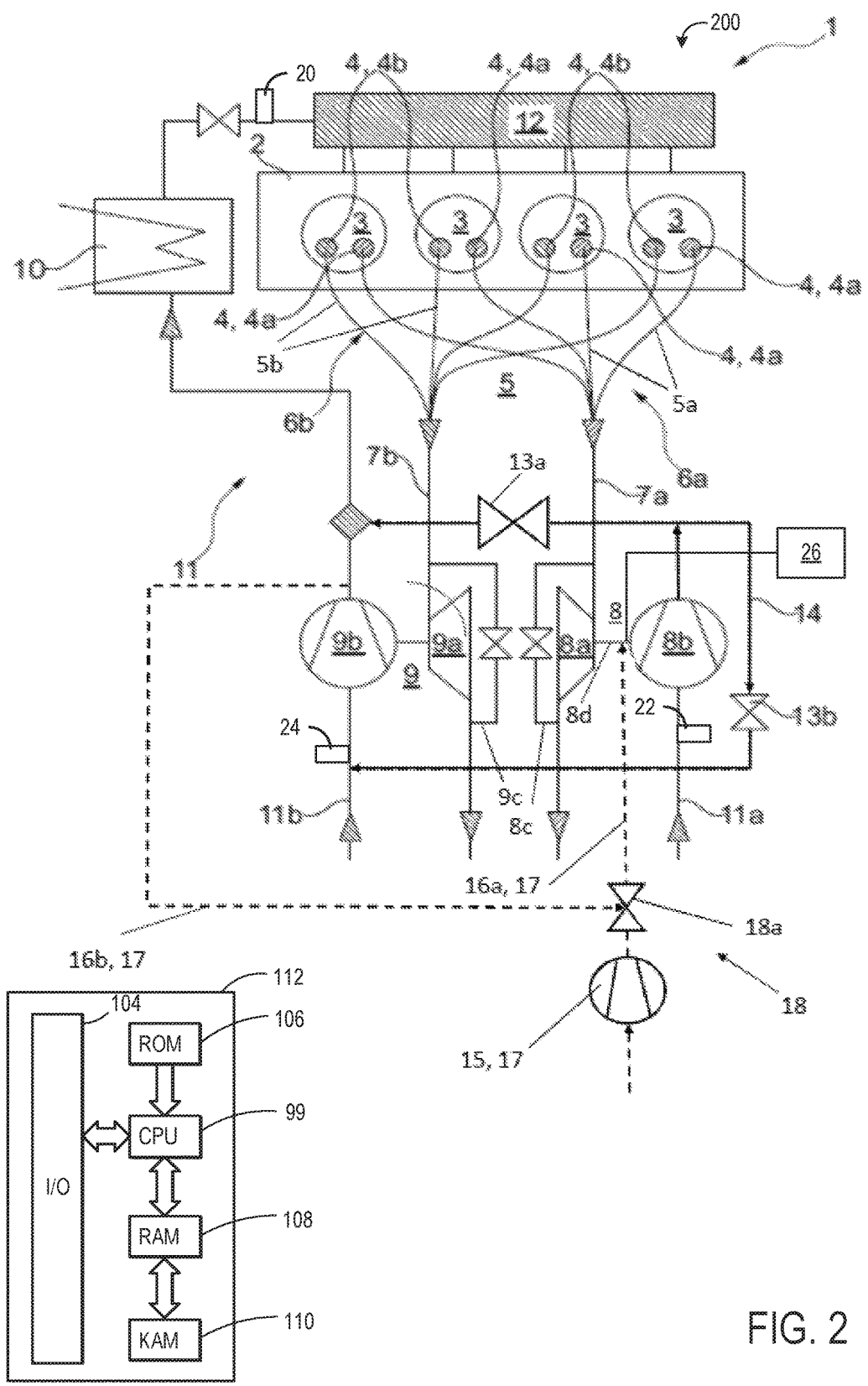
FIG. 2 schematically shows a second embodiment of the internal combustion engine.

FIG. 2 schematically shows a second embodiment of an engine system 200 including the supercharged internal combustion engine 1. It is sought to explain only the differences in relation to the embodiment illustrated in FIG. 1, for which reason reference is otherwise made to FIG. 1. The same reference signs have been used for the same components.

In the present case, too, auxiliary mechanism 17 for increasing the pressure on the compressor-side end of the bearing arrangement of the shaft 8d of the first exhaust-gas turbocharger 8 is provided. In addition to the pump 15 illustrated in FIG. 1, which subjects the bearing seal to the action of compressed air at the compressor side via the first feed line 16a, a second feed line 16b is provided which branches off from the intake system 11 downstream of the second compressor 9b and which provides charge air which serves as compressed air. Then, the pressure at the compressor-side end of the bearing arrangement of the shaft 8b is increased also using the charge pressure which prevails, and can be picked off, downstream of the second, operational compressor 9b in the intake system 11.

The second feed line 16b opens into the first feed line 16a, with a junction 18 being formed, a shut-off element 18a being arranged at the junction 18.

The pressure at the compressor-side end of the bearing arrangement of the shaft 8d of the deactivated first exhaust-gas turbocharger 8 is increased by way of auxiliary mechanism 17, specifically either using the second feed line 16b, if a charge pressure $p_{charge}$ prevailing in the intake system 11 downstream of the second compressor 9b is higher than a predefinable minimum charge pressure $p_{charge,min}$, or using the pump 15 and the first feed line 16a if the charge pressure $p_{charge}$ prevailing in the intake system 11 downstream of the second compressor 9b is lower than a predefinable minimum charge pressure $p_{charge,min}$.

Figure 3:
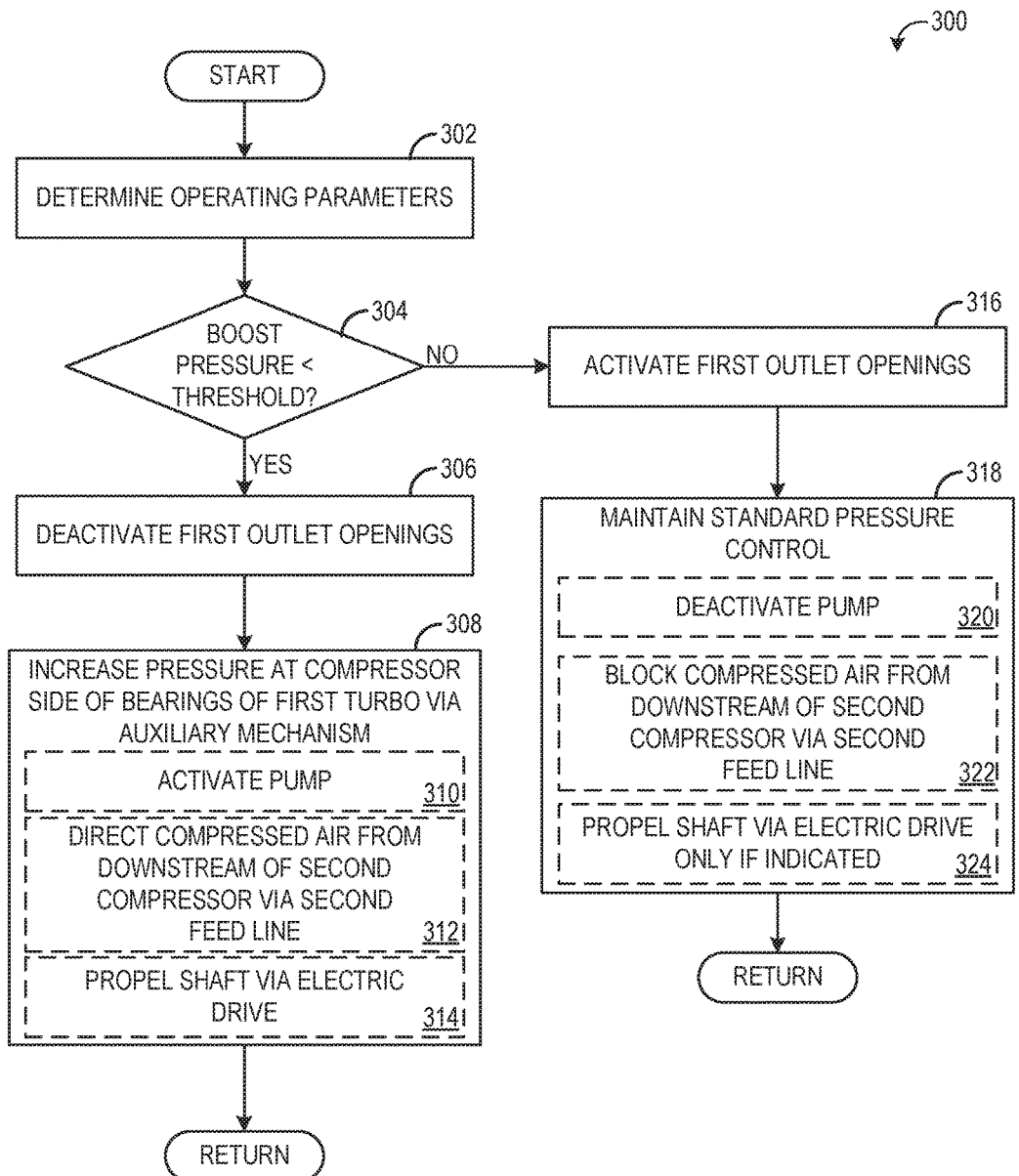
FIG. 3 is a flow chart illustrating an example method for increasing pressure at a compressor-side end of a bearing arrangement of a turbocharger.

Turning to FIG. 3, a flow chart illustrating a method 300 for increasing compressor-side end bearing pressure in an engine system (such as the system of FIG. 1 or FIG. 2) is shown. Instructions for carrying out method 300 and the rest of the methods included herein may be executed by a controller (e.g., controller 112) based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, method 300 includes determining operating parameters. The determined operating parameters may include, but are not limited to, engine speed, engine load, boost pressure, mass air flow upstream of each compressor, exhaust mass flow, and other parameters. At 304, method 300 includes determining if boost pressure is greater than a first threshold pressure. Boost pressure may be determined from output from one or more sensors, such as MAP sensor 20, and/or based on pressure at a compressor outlet (e.g., compressor 9b). Boost pressure may be the pressure in the intake manifold and/or at the compressor outlet relative to ambient pressure. The first threshold boost pressure may be a pressure at which compression from both compressors is needed to reach the threshold pressure; at pressures lower than the first threshold boost pressure, commanded boost pressure may be reached using only one compressor (e.g., the second compressor 9b).

If boost pressure is lower than the first threshold, method 300 proceeds to 306 to deactivate the first outlet openings (e.g., first outlet openings 4a) of each cylinder. By deactivating the first outlet openings, exhaust gas is directed only to the second exhaust manifold (e.g., manifold 6b) and second overall exhaust line (e.g., exhaust line 7b) and does not travel through the first exhaust manifold (manifold 6a) or the first overall exhaust line (line 7a). As a result, rotation of the second turbine (turbine 9a) of the second turbocharger, but not the first turbine (turbine 8a) of the first turbocharger, occurs, and only the second compressor (compressor 9b) and not the first compressor (compressor 8b) is driven. In this way, the second compressor may provide the commanded boost even during low exhaust gas mass flow conditions where sufficient exhaust gas is not available to adequately drive both turbines.

However, as explained above, when the first compressor remains at a standstill (e.g., is not driven), a pressure gradient across the compressor may cause oil to leak out of the bearing arrangement of the shaft of the first turbocharger. Thus, to counteract this pressure gradient, the pressure at the compressor-side end of the bearing arrangement of the shaft of the first turbocharger may be increased via an auxiliary mechanism, as indicated at 308.

One or more auxiliary mechanisms may be utilized to increase the pressure at the compressor-side end of the bearing arrangement of the shaft of the first turbocharger. In one example, indicated at 310, a pump, such as pump 15, may be activated. The pump may be fluidically coupled to the compressor-side end of the bearing arrangement of the shaft of the first turbocharger, for example via a first feed line (e.g., line 16a). When the pump is activated, compressed air from the pump may be supplied to the compressor-side end of the bearing arrangement of the shaft of the first turbocharger.

In another example indicated at 312, compressed air may be directed from downstream of the second compressor to the compressor-side end of the bearing arrangement of the shaft of the first turbocharger via a second feed line (e.g., line 16b). The second feed line may be fluidically coupled to the first feed line at a junction and a shut-off element (e.g., shut-off element 18a). In order to supply the compressed air from downstream of the second compressor, the shut-off element may be opened, thus establishing the fluidic communication between the outlet of the second compressor and the compressor-side end of the bearing arrangement of the shaft of the first turbocharger via the second feed line.

In a still further example indicated at 314, the shaft of the first turbocharger may be propelled via an electric drive (e.g., motor 26). When the electric drive is activated, the shaft of the first turbocharger rotates, which reduces the pressure gradient across the first compressor.

In some examples, only one of the above-described auxiliary mechanisms may be utilized to increase the compressor-side end of the bearings of the shaft of the first turbocharger. For example, the engine system 100 of FIG. 1 may only include a pump and an electric drive, and may not include a second feed line. As such, in the engine system 100, the pump may be activated and/or the electric drive may be activated. In other systems that include the pump, second feed line, and the electric drive (such as the engine system 200 of FIG. 2), the decision of which auxiliary mechanism to utilize may be based on available electric energy and/or available boost pressure. For example, the compressed air from downstream of the second compressor may be directed to the compressor-side end of the bearings of the shaft of the first turbocharger only when boost pressure is greater than a minimum pressure (which may be lower than the first threshold pressure described above). When boost pressure is not greater than this minimum pressure, one or more of the pump and electric drive may be activated to provide the increased pressure. In this way, torque may be maintained during the lower-boost conditions by avoiding depletion of the available boost, while battery depletion may be minimized by only operating the pump and/or electric drive when boost is not available. Further, the electric drive may be preferentially activated (e.g., relative to the pump) when it is anticipated activation of the first turbine will occur in a relatively short time frame, in order to bring the first turbocharger up to speed and enable a rapid transition and avoid torque loss when the switch from operating with only one turbocharger to operating with two turbochargers occurs.

Returning to 304, if it is determined that boost pressure is not less than the first threshold, method 300 proceeds to 316 to activate the first outlet openings (or maintain the first outlet openings active). By activating the first outlet openings, exhaust gas is directed to both the second exhaust manifold and second overall exhaust line and to the first exhaust manifold and the first overall exhaust line. As a result, rotation of the second turbine of the second turbocharger and rotation the first turbine of the first turbocharger occurs, and both the second compressor and the first compressor (compressor 8b) are driven, in order to provide the requested boost pressure.

At 318, method 300 includes maintaining (or resuming) standard pressure control. When the first compressor is rotating in order to compress the intake air, the risk of oil leaking from the bearing arrangement is minimized, and thus a pressure increase via the auxiliary mechanisms is not needed. As such, the pump may be deactivated, as indicated at 320, compressed air flow via the second feed line may be blocked, as indicated at 322, and the shaft of the first turbocharger may only be propelled via the electric drive if indicated for other reasons (e.g., rapid speed build of the first turbocharger), as indicated at 324. Method 300 then returns.

Thus, the method 300 described above provides for minimizing a pressure gradient across a deactivated compressor by causing rotation of the compressor and/or by directly applying pressure at the bearings of the compressor-side end of the shaft of the deactivated turbocharger. The turbocharger may be deactivated responsive to a low boost pressure demand, as explained above. However, other conditions may prompt a deactivation of the turbocharger, such as low exhaust gas mass flow. When the turbocharger is deactivated, a second turbocharger may remain active to provide the demanded boost pressure. The first turbocharger may be deactivated by deactivating exhaust valves of the cylinders that lead to the first turbocharger turbine. In other examples, the first turbocharger may be deactivated via adjustment of a wastegate or turbine bypass valve, or according to an alternate mechanism.

Figure 4:
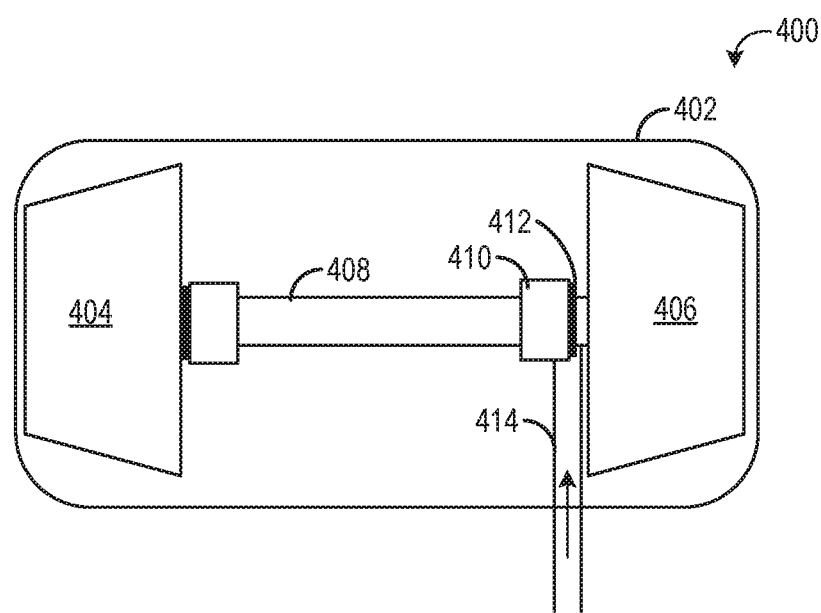
FIG. 4 schematically shows an example turbocharger.

In one example, the compressed air (e.g., from the pump and/or from downstream of the second compressor) may be directly supplied to the compressor-side end of the bearing arrangement of the shaft of the first turbocharger. FIG. 4 schematically shows an example turbocharger 400 that may be supplied with compressed air. Turbocharger 400 is a non-limiting example of turbocharger 8 of FIGS. 1 and 2. Turbocharger 400 includes a housing 402. Within housing 402 is a turbine 404 coupled to a compressor 406 via a shaft 408. While a single housing is illustrated, it is to be understood that in some examples, separate compressor and turbine housings may be provided. Further, while not illustrated, the turbine and compressor are each provided with gas (exhaust gas and intake air, respectively) via a respective inlet and outlet, and the expanded or compressed gas is released via a respective outlet.

Shaft 408 includes bearings on the turbine-side end and the compressor-side end. As shown, the compressor-side end includes bearings 410. The bearings may be ball bearings or other suitable bearings that are supplied with oil. Further, a seal 412 may be present to prevent oil from leaking to the compressor. The bearings 410 and/or seal 412 may be supplied with compressed air via a first feed line 414. The positioning of the first feed line is exemplary, and other locations for the first feed line are possible, such as being fluidically coupled to the compressor wheel, compressor inlet, and/or compressor outlet.

The technical effect of increasing the pressure at the bearings of the compressor-side end of the shaft of a deactivated turbocharger is reduced oil leakage at the bearings, increasing turbocharger life and avoiding engine degradation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a supercharged internal combustion engine having at least two cylinders and having an intake system for supply of charge air to the at least two cylinders, each cylinder having at least two outlet openings for discharge of exhaust gases, at least one of the at least two outlet openings in each cylinder in the form of an activatable outlet opening, each outlet opening being adjoined by an exhaust line for the discharge of the exhaust gases via an exhaust-gas discharge system, a first exhaust-gas turbocharger and a second exhaust-gas turbocharger, the first exhaust-gas turbocharger comprising a first turbine and a first compressor which are arranged on a first shaft, which first shaft is mounted rotatably in an oil-lubricated bearing arrangement, the second exhaust-gas turbocharger comprising a second turbine and a second compressor which are arranged on a second shaft, the first compressor and the second compressor are arranged in parallel in the intake system, the first compressor being arranged in a first intake line and the second compressor being arranged in a second intake line of the intake system, and the first and second intake lines merging, downstream of the first and second compressors, to form an overall intake line, a first shut-off valve arranged downstream of the first compressor, in the first intake line, respective exhaust lines of the activatable outlet openings of the at least two cylinders merge to form a first exhaust manifold coupled to a first overall exhaust line which is connected to the first turbine of the first exhaust-gas turbocharger, and respective exhaust lines of the other outlet openings of the at least two cylinders merge to form a second exhaust manifold coupled to a second overall exhaust line which is connected to the second turbine of the second exhaust-gas turbocharger, the method comprising:

during a first condition, including a deactivated first turbine and deactivated outlet openings, increasing a pressure at a compressor-side end of the bearing arrangement of the first shaft of the first exhaust-gas turbocharger using an auxiliary mechanism, wherein the auxiliary mechanism comprises one or more of a pump, a second feed line, and an electric auxiliary drive.

2. The method as claimed in claim 1, wherein increasing the pressure at the compressor-side end of the bearing arrangement of the first shaft of the first exhaust-gas turbocharger using the auxiliary mechanism comprises increasing the pressure using the pump, compressed air being provided by way of the pump via a first feed line, wherein the auxiliary mechanism comprises the pump.

3. The method as claimed in claim 1, wherein increasing the pressure at the compressor-side end of the bearing arrangement of the first shaft of the first exhaust-gas turbocharger using the auxiliary mechanism comprises increasing the pressure using the second feed line, said second feed line branching off from the intake system downstream of the second compressor and providing charge air which serves as compressed air, wherein the auxiliary mechanism comprises the second feed line.

4. The method as claimed in claim 3, wherein the compressed air is used in order to drive the first compressor and set the shaft in rotation.

5. The method as claimed in claim 3, wherein the compressed air is used to directly increase the pressure at the compressor-side end of the bearing arrangement of the first shaft of the first exhaust-gas turbocharger.

6. The method as claimed in claim 3, wherein the compressed air is used to increase the pressure in the first intake line of the first compressor.

7. The method as claimed in claim 3, wherein increasing the pressure at the compressor-side end of the bearing arrangement of the first shaft of the first exhaust-gas turbocharger comprises:

increasing the pressure using the second feed line if a charge pressure $p_{charge}$ prevailing in the intake system downstream of the second compressor is higher than a predefinable minimum charge pressure $p_{charge,min}$, with $p_{charge} \geq p_{charge,min}$, and increasing the pressure using the pump and a first feed line if the charge pressure $p_{charge}$ prevailing in the intake system downstream of the second compressor is lower than the predefinable minimum charge pressure $p_{charge,min}$, with $p_{charge} < p_{charge,min}$.

8. The method as claimed in claim 1, wherein increasing the pressure at the compressor-side end of the bearing arrangement of the first shaft of the first exhaust-gas turbocharger using the auxiliary mechanism comprises increasing the pressure using the second feed line, said second feed line branching off from the intake system downstream of the second compressor and providing charge air which serves as compressed air, the pressure at the compressor-side end of the bearing arrangement of the first shaft of the first exhaust-gas turbocharger being increased using the second feed line if a charge pressure $p_{charge}$ prevailing in the intake system downstream of the second compressor is higher than a predefinable minimum charge pressure $p_{charge,min}$, with $p_{charge} \geq p_{charge,min}$, wherein the auxiliary mechanism comprises the second feed line.

9. The method as claimed in claim 1, wherein increasing the pressure at the compressor-side end of the bearing arrangement of the first shaft of the first exhaust-gas turbocharger comprises increasing the pressure using the electric auxiliary drive which is at least connectable in terms of drive to the first shaft of the first exhaust-gas turbocharger, an activated electric auxiliary drive setting the first shaft and at least one compressor impeller mounted on the shaft in rotation, wherein the auxiliary mechanism comprises the electric auxiliary drive.

10. The method as claimed in claim 9, wherein the pressure at the compressor-side end of the bearing arrangement of the first shaft of the first exhaust-gas turbocharger is increased using the electric auxiliary drive if a charge pressure $p_{charge}$ prevailing in the intake system downstream of the second compressor is lower than a predefinable minimum charge pressure $p_{charge,min}$, with $p_{charge} < p_{charge,min}$.

11. A system, comprising:

a supercharged internal combustion engine having at least one cylinder head having at least two cylinders;

an intake system for supply of charge air to the at least two cylinders;

each cylinder having a first outlet opening and a second outlet opening for discharge of exhaust gases, each first outlet opening being an activatable outlet opening, each first outlet opening being adjoined by a first exhaust line and each second outlet opening being adjoined by a second exhaust line for the discharge of the exhaust gases via an exhaust-gas discharge system, a first exhaust-gas turbocharger and a second exhaust-gas turbocharger, the first exhaust-gas turbocharger comprising a first turbine and a first compressor which are arranged on a same first shaft, which first shaft is mounted rotatably in a first oil-lubricated bearing arrangement, the second exhaust-gas turbocharger comprising a second turbine and a second compressor which are arranged on a same second shaft;

the first and second compressors arranged in parallel in the intake system, the first compressor being arranged in a first intake line of the intake system and the second compressor being arranged in a second intake line of the intake system, and the first and second intake lines merging, downstream of the first and second compressors, to form an overall intake line;

a first shut-off valve arranged downstream of the first compressor, in the first intake line, each first exhaust line merging to form a first exhaust manifold coupled to a first overall exhaust line which is connected to the first turbine of the first exhaust-gas turbocharger;

each second exhaust line merging to form a second exhaust manifold coupled to a second overall exhaust line which is connected to the second turbine of the second exhaust-gas turbocharger; and an auxiliary mechanism for increasing a pressure at a compressor-side end of the first bearing arrangement of the first shaft of the first exhaust-gas turbocharger, wherein the auxiliary mechanism comprises one or more of a pump and a second feed line.

12. The system as claimed in claim 11, wherein the auxiliary mechanism comprises the pump that, when operational, provides compressed air via a first feed line.

13. The system as claimed in claim 12, wherein the auxiliary mechanism further comprises the second feed line, said second feed line branching off from the intake system downstream of the second compressor and providing charge air which serves as compressed air.

14. The system as claimed in claim 13, wherein the second feed line opens into the first feed line.

15. The system as claimed in claim 14, further comprising a shut-off valve arranged at a junction where the second feed line opens into the first feed line.

16. The system as claimed in claim 11, further comprising a blow-off line which branches off from the first intake line between the first compressor and the first shut-off valve and which opens into the second intake line upstream of the second compressor, a second shut-off valve being arranged in the blow-off line.

17. A method for an engine coupled to a first turbocharger and a second turbocharger, comprising:
    responsive to a first condition, deactivating a first turbine of the first turbocharger and meeting a boost demand via operation of the second turbocharger; and
    responsive to deactivating the first turbine, increasing a pressure at a compressor-side end of a bearing arrangement of a shaft of the first turbocharger with an auxiliary mechanism, wherein the auxiliary mechanism comprises one or more of a pump and a second feed line.

18. The method of claim 17, wherein increasing the pressure with the auxiliary mechanism comprises:
    when boost pressure is less than a threshold pressure, activating the pump and supplying compressed air from the pump to the first turbocharger via a first feed line; and
    when boost pressure is greater than the threshold pressure, opening a shut-off valve positioned in the second feed line to direct compressed charge air from downstream of a second compressor of the second turbocharger to the first turbocharger.

19. The method of claim 17, wherein the first condition comprises one or more of boost pressure lower than a threshold pressure and exhaust gas mass flow lower than a threshold mass flow.

* * * * *